United States Patent [19]

Dickey et al.

[11] Patent Number: 4,755,360
[45] Date of Patent: Jul. 5, 1988

[54] CATALYTIC CONVERTER FOR GAS TURBINE BLEED AIR EXTRACTION

[75] Inventors: Thomas A. Dickey, Westport; George W. Kremer, Killingworth, both of Conn.

[73] Assignee: Avco Corporation, Providence, R.I.

[21] Appl. No.: 10,206

[22] Filed: Feb. 3, 1987

[51] Int. Cl.⁴ .................................................. A62B 7/08
[52] U.S. Cl. .................................... 422/122; 422/177; 422/180
[58] Field of Search ............... 422/122, 177, 180; 60/299, 302

[56] References Cited

U.S. PATENT DOCUMENTS 3,785,781  1/1974  Hervert et al. ................. 422/180
4,348,360  9/1982  Chang et al. .................... 422/122

Primary Examiner—Barry S. Richman
Assistant Examiner—William R. Johnson
Attorney, Agent, or Firm—Perman & Green

[57] ABSTRACT

An assembly for removing substantially all oil contamination from bleed air flowing at a temperature of the order to 600–650 degrees Fahrenheit from a bleed air port of a gas turbine aircraft engine to a duct leading to the cabin ventilation system of an aircraft. The assembly comprises a gas turbine engine and a catalytic converter interposed between and sealably coupled to the bleed air port of the engine and the ventilation duct, at a location near the engine. The catalytic converter comprises at least one catalytic converter matrix element through which the bleed air must flow at high temperature and at a mean velocity, each matrix element comprising a parallel array of slender tubules, which are coated internally with a catalytically active coating which produces oil-breakdown at the temperatures and residence time produced by the engine at continuous maximum thrust.

5 Claims, 1 Drawing Sheet

U.S. Patent
Jul. 5, 1988
4,755,360
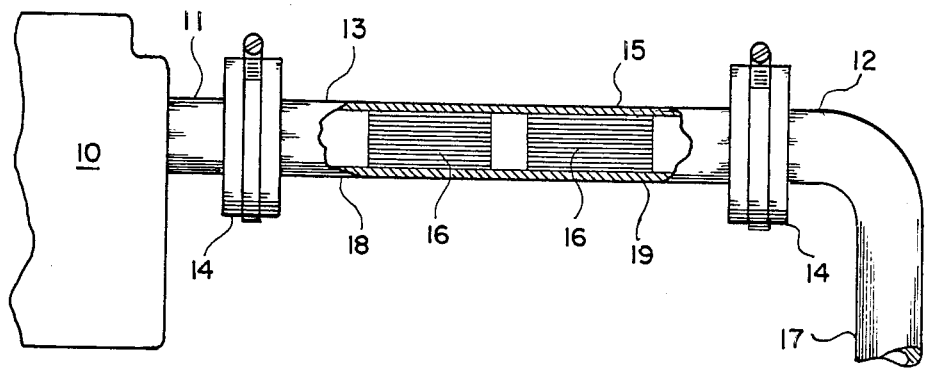
_Fig 1_
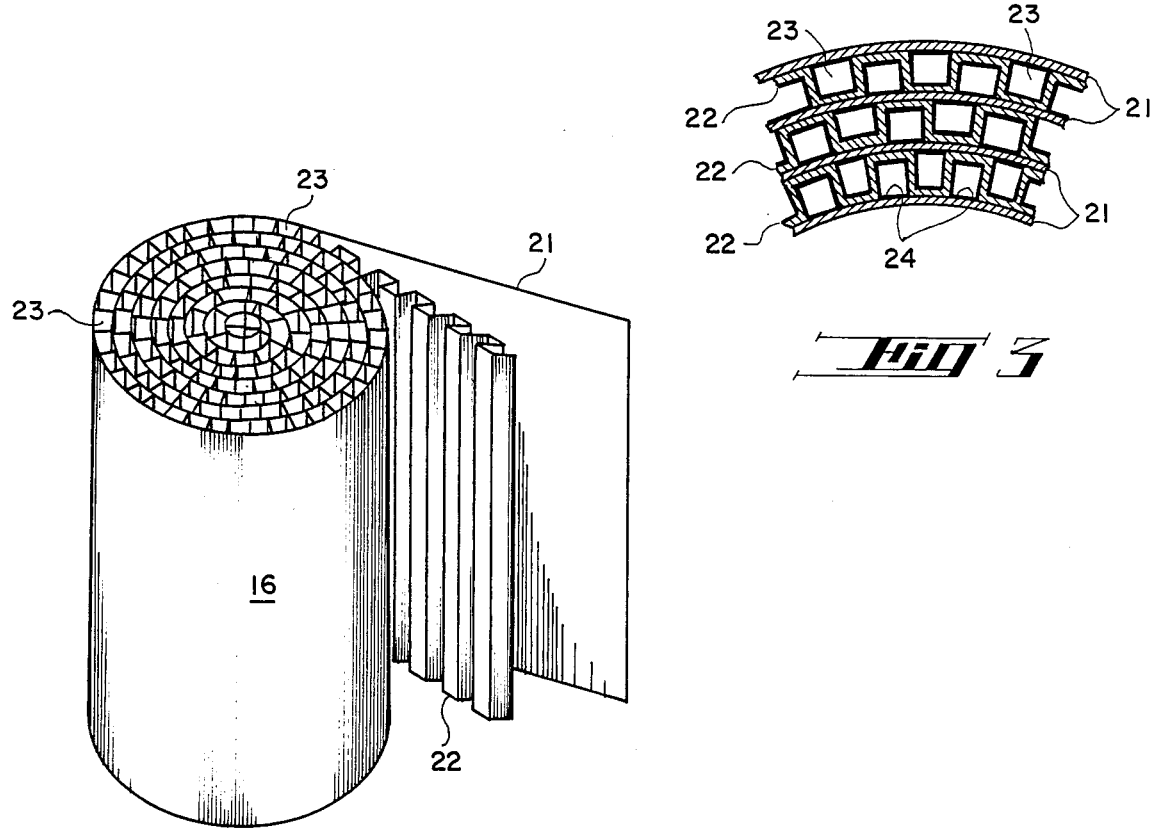
_Fig 3_
_Fig 2_

CATALYTIC CONVERTER FOR GAS TURBINE BLEED AIR EXTRACTION

BACKGROUND OF THE INVENTION

1. Field of the Invention

This invention relates generally to systems and apparatus for extraction and utilization of bleed air from the compressor section of a gas turbine engine, and relates more particularly to such systems and apparatus for supplying pressurized breathing air to the passenger cabin of an aircraft propelled by gas turbine means.

2. Prior Art Problem

If any oil leaks into a source of bleed air within a gas turbine engine, the aircraft cabin ventilated by that air may smell and appear smoky, an annoyance to the cabin occupants. Moreover, such oil-contaminated air can not only foul plastic surfaces and windows but can also seriously interfere with the proper operation of air-conditioning components such as air bearings of turbo-expanders. It is very difficult to prevent small amounts of oil from leaking into the compressor stage, as from a bearing. One remedy for this problem is to place a charcoal filter in the ventilating air duct. However, that filter tends to be bulky and to introduce a considerable pressure drop; moreover, the charcoal must be replaced when it becomes contaminated with oil.

SUMMARY OF THE INVENTION

It is therefore the principal object of this invention to provide a method and apparatus for removing substantially all oil contamination from bleed air intended for use in cabin ventilation. It is a further object of this invention to perform that removal with apparatus which is light and compact, which introduces only a moderate pressure drop, and which does not require frequent replacement of filter components. According to this invention, those objects are attained by interposing, in the flow of moderately-high-temperature pressurized bleed air in the bleed air line near the engine, a catalytic converter element which catalyzes the oxidation of the contaminating oil to carbon dioxide and water vapor, resulting in no odor or visible vapor in the cabin. These and further objects of this invention, as well as the means for attaining them, are set forth in the following Specification and Drawings, wherein:

BRIEF DESCRIPTION OF THE DRAWINGS

FIG. 1 is a schematic diagram, largely in cross-section, of a catalytic converter positioned in a bleed air duct connected to a gas turbine engine;

FIG. 2 is a perspective view of a partly-assembled matrix element of the catalytic converter diagrammed in FIG. 1; and FIG. 3 is an enlarged fragmentary cross-section of a portion of the assembled matrix element.

DESCRIPTION OF THE INVENTION

Reference is made to FIG. 1, which shows the connection of the catalytic converter in the bleed air line between the gas turbine engine and the duct which leads to the cabin ventilation system. The gas turbine engine, indicated generally by 10, has a bleed air port 11 connecting to a stage of the compressor section of gas turbine 10, at which stage bleed air is available at temperatures of the order of 600 to 650 degrees Fahrenheit, at maximum continuous thrust rating, down to about 400 degrees Fahrenheit at reduced power. Bleed air flows may typically be up to about 1 pound per second, and oil content of the bleed air may range from negligible amounts up to concentrations of the order of 30 milligrams per cubic meter.

Between bleed air port 11 and air duct 12 leading to the air-conditioning components (not shown) for adjusting pressure and temperature of cabin air, I interpose a catalytic converter 13 joined and sealed to port 11 and duct 12 by conventional coupling means 14 suitable for the temperature and pressure of the bleed air. Catalytic converter 13 comprises a pipe 15 wherein is sealably mounted at least one catalytic converter matrix element 16 through which the bleed air must flow; the preferred embodiment of this element 16 is shown in partially assembled form in FIG. 2, and a cross-section of a portion of such an element is shown in FIG. 3.

As shown in the Figures, this preferred embodiment is made by rolling up together two thin sheets of corrosion-resistant steel, one sheet 21 being smooth and the other sheet 22 being corrugated. When so rolled up and fastened together, they define a parallel array of a large number of slender tubules 23, of small individual cross dimension and mean cross-section area determined by the spacing and depth of the corrugations of sheet 22, through which the bleed air flows in parallel. The width of sheets 21 and 22, parallel to the corrugations, defines an element length and corresponding element tubule length through which the bleed air must flow at a mean flow velocity equal to the total volumetric flow rate of bleed air divided by the sum of the individual tubule cross-section areas. When more than one element 16 is arrayed in series, as shown in FIG. 1, the effective tubule length, to be traversed by the bleed air flow, is the sum of the element tubule lengths. To facilitate later discussion, it is useful to define, as "flow residence time", the time spent by a typical packet of bleed air in flowing through catalytically active tubules, that is, the quotient of the effective tubule length divided by the mean flow velocity in the tubules.

The interior surfaces of the tubules are coated with a thin, bonded and catalytically active coating 24 of finely-divided particles of metals, such as platinum, chosen from group VIII of the periodic table of elements. It is to be understood that some dimensions have been exaggerated in the Figures. in the interest of clarity: the spacing and depth of corrugations of sheet 22 and the consequent mean cross-dimension of a tubule 23 are typically of the order of 1/16 inch and the mean cross-section area of a tubule is of the order of 0.004 square inches (0.025 sq. cm.), the metal thickness of sheets 21 and 22 is typically of the order of 0.001 inch, and coating 24 is even thinner.

EXPERIMENTAL VERIFICATION

In order to find out whether this scheme could work and, if so, what amounts and arrangements of catalytic elements would be required to render bleed air odor-free, full-scale experiments were performed.

1. Experimental Apparatus

The experimental arrangement was schematically similar to that shown in FIG. 1. Gas turbine 10 was an AVCO Lycoming Model ALF 502 aircraft engine operated in a ground test installation. Oil was metered into the engine through the anti-icing bleed air port or in the neighborhood of the No. 2 bearing package at rates from 4.7 to 29.6 milliliters per minute. Pipe 15 of catalytic converter 13 was long enough to hold snugly seven matrix elements 16, each of which was 3.875 inches outside diameter and 3.5 inches long.

These catalytic converter matrix elements were supplied by Johnson-Matthey, Inc. of Wayne, Pa., U.S.A., who call it "Monolith" material. Fourteen elements were supplied, seven with an active coating of platinum and the like, suited to moderately-low-temperature catalytic combustion, and seven elements of bare corrosion-resistant steel for use as inactive spacers when fewer than seven active elements were to be in the flow train.

To simulate the flow resistance of the cabin air conditioning system, and to allow testing at a number of mass flows of bleed air, end 17 of duct 12 was provided with a set of interchangeable orifices. Other test components were aperture plates to mask off part of the frontal area of matrix elements to increase flow velocity, and tube inserts to replace bare matrix elements, to make sure that they were not catalytically active.

Pipe 15 was tapped at locations 18 and 19, respectively upstream and downstream of matrix elements 16, to permit measurements of bleed air pressure and temperature and to draw off small sample flows which were cooled and then analyzed by both a gas chromatograph and by simply sniffing to detect odor.

2. Experimental Results

It was discovered that the sniff test was more sensitive than the available chromatograph. Upon analysis of data, a clear pattern of results appeared: for operation at maximum continuous thrust rating and ordinary bleed air pressures of about 170 p.s.i.a. and temperatures of the order of 600-650 degrees Fahrenheit and flow residence times of at least 30 milliseconds in catalytically active tubules of the size used, the air was substantially odor-free. This corresponded, at ordinary bleed air mass flows, to a ratio, of effective tubule length to mean tubule cross dimension, of at least 112. More particularly, it appeared that the ratio of tubule mean cross-section area to flow residence time should be no greater than 0.84 square centimeters per second, to obtain odor-free bleed air. This number was unexpectedly large, since the diffusivity of air at that pressure and temperature is only about 0.09 square centimeters per second, and the Reynolds Number of the flows in the tubules was below unity, which should result in laminar flow. Whatever the reason may be, only a small amount of catalytic converter matrix material, of the order of two elements, sufficed to render the bleed air odorless for many bleed air mass flows of practical interest. As a result, resistance to flow of bleed air, and consequent pressure drop, was unexpectedly and pleasingly low.

In addition to the tests at maximum continuous thrust rating, two tests were run at reduced power such that bleed air temperature ws only about 400 degrees Fahrenheit. One test using seven elements showed effective odor removal; another test using two elements did not. From this limited data base, it appears the lower temperature requires a greater flow resistance time, possibly an order of magnitude greater. As a rule of thumb for initial design for use at reduced power, where bleed air temperature is about 400 degrees Fahrenheit, one might require that the ratio of tubule mean cross-section area to flow residence time be no greater than 0.084 square centimeters per second, to obtain odor-free bleed air.

Given the foregoing teaching, those skilled in the art to which this invention pertains may readily devise further or extended embodiments. For one example, my preferred catalytic element of parallel-packed tubules could be replaced by a packing of catalyst-coated shapes such as spheres, but with considerable increase in pressure drop. Or the matrix element could be made of a bonded bundle of slender tubes of metal or ceramic. Various other features and advantages not specifically enumerated will occur to those versed in the art, as likewise many variations of the embodiment illustrated, all of which may be achieved without departing from the spirit and scope of the invention as defined by the following claims:

We claim:

1. An assembly for removing substantially all oil contamination from bleed air flowing at a temperature of the order of 600-650 degrees Fahrenheit from a bleed air port of a gas turbine aircraft engine to a duct leading through an air conditioning component to the cabin ventilation system of an aircraft, said assembly comprising a gas turbine aircraft engine having a bleed port containing bleed air at a temperature of the order of 600-650 degrees Fahrenheit, means defining a duct, a catalytic converter interposed between and sealably coupled between said port and said duct at a location with respect to said engine such that the temperature of bleed air entering the converter is in the range of 600-650 degrees Fahrenheit, said catalytic converter further comprising a pipe wherein there is sealably mounted at least one catalytic converter matrix element through which said bleed air must flow at a mean velocity and at a temperature of the order of 600 to 650 degrees Fahrenheit, each said matrix element comprising a parallel array of a large number of slender tubules through which said bleed air flows in parallel, said tubules being coated internally with a catalytically active coating comprising finely-divided particles of metals chosen from group VIII of the periodic table of the elements, said tubules having an element tubule length and small individual cross-dimension and mean individual cross-section area, effective tubule length of a series-arrayed plurality of such catalytic converter matrix elements being the sum of their element tubule lengths, flow residence time being the quotient of said effective tubule length divided by said mean flow velocity, and the ratio of said mean individual cross-section area to said flow residence time being not greater than 2.52 square centimeters per second.

2. An assembly according to claim 1 in which said mean cross-section area is of the order of 0.004 square inches and said flow residence time is of the order of 30 milliseconds.

3. An assembly according to claim 1 in which said mean cross-dimension is of the order 1/16 inch and the ratio of said effective tubule length of said cross-dimension is at least 112.

4. An assembly according to claim 1 and further capable of removing substantially all oil contamination from bleed air at a temperature of only about 400 degrees Fahrenheit, wherein said ratio of said tubule mean individual cross-section area to said flow residence time is not greater than 0.084 square centimeters per second.

5. An assembly according to claim 1 in which said catalytic coverter matrix element comprises two sheets of thin metal rolled up together parallel to an axis of rolling up and fastened together, one said sheet being smooth and the other said sheet being formed with corrugations, the spacing and depth of said corrugations being of the same magnitude as said mean individual cross-dimension of said tubules and said corrugations being directed parallel to said axis of rolling up.

* * * * *